(12) United States Patent
Froeschner et al.

(10) Patent No.: US 7,496,424 B2
(45) Date of Patent: Feb. 24, 2009

(54) METHOD OF MANUFACTURING A PRESSURE INTENSIFYING TOOL AND TOOL PRODUCED THEREBY

(75) Inventors: Neal A. Froeschner, Florissant, MO (US); Jim S. Piszar, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/233,729

(22) Filed: Sep. 23, 2005

(65) Prior Publication Data

US 2007/0073433 A1    Mar. 29, 2007

(51) Int. Cl.
*G06F 19/00* (2006.01)
(52) U.S. Cl. .................. 700/119; 700/98; 700/117
(58) Field of Classification Search .......... 700/95, 700/98, 117, 118, 119, 120, 182; 264/401; 228/110.1; 425/78; 156/212, 216, 285, 475
See application file for complete search history.

(56) References Cited

U.S. PATENT DOCUMENTS

| | | | | |
|---|---|---|---|---|
| 4,035,224 A | * | 7/1977 | Anderson | 156/216 |
| 4,575,330 A | * | 3/1986 | Hull | 700/120 |
| 6,113,724 A | * | 9/2000 | Ogawa | 156/212 |
| 6,214,279 B1 | * | 4/2001 | Yang et al. | 700/119 |
| 6,324,438 B1 | * | 11/2001 | Cormier et al. | 700/118 |
| 6,391,251 B1 | * | 5/2002 | Keicher et al. | 425/78 |
| 6,401,002 B1 | * | 6/2002 | Jang et al. | 700/119 |
| 6,450,393 B1 | * | 9/2002 | Doumanidis et al. | 228/110.1 |
| 6,532,394 B1 | * | 3/2003 | Earl et al. | 700/119 |
| 6,849,150 B1 | * | 2/2005 | Schmidt | 156/285 |
| 6,934,600 B2 | * | 8/2005 | Jang et al. | 700/119 |
| 2002/0125613 A1 | * | 9/2002 | Cominsky | 264/401 |

* cited by examiner

*Primary Examiner*—Albert DeCady
*Assistant Examiner*—Charles R Kasenge
(74) *Attorney, Agent, or Firm*—Tung & Associates; James M. Poole

(57) ABSTRACT

A tool used to direct the pressure applied to features of a plastic laminate part layup during co-curing or co-bonding is manufactured using direct digital manufacturing techniques. A CAD drawing representing the tool is generated and converted into digital data file suitable for controlling the operation of a rapid prototyping machine. The tool is formed in the rapid prototyping machine by additive layering of material until the features and dimensions of the layered material correspond to the CAD drawing. The resulting tool exhibits geometries and dimensions virtually identical to the theoretical dimensions of the CAD model of the tool.

12 Claims, 2 Drawing Sheets

METHOD OF MANUFACTURING A PRESSURE INTENSIFYING TOOL AND TOOL PRODUCED THEREBY

FEDERALLY SPONSORED RESEARCH OR DEVELOPMENT

This invention made with Government support under contract number N00014-01-2-0001 awarded by the United States Navy. The Government has certain rights in this invention.

FIELD OF THE INVENTION

This invention generally relates to manufacturing processes and tools used to fabricate composite laminate parts, especially those employing plastics, and deals more particularly with a method of manufacturing a tool for directing the compaction pressure applied to certain features of a plastic laminate part layup during co-curing or co-bonding thereof.

BACKGROUND OF THE INVENTION

Composite structures are widely used in high performance applications because of their light weight, high strength, high stiffness and superior fatigue resistance. These structures broadly comprise a combination of dissimilar constituent materials bonded together by a binder, but are most commonly formed by a thermosetting resin matrix in combination with a fibrous reinforcement, typically in the form of a sheet or mat. Multiple plies of the matting are impregnated with a binder such as epoxy plastic resin or polyester resin, and formed into a "layup". Pressure and heat are applied to the multi-layer part layup in order to compress and cure the plies, thereby forming a rigid structure.

Certain features of composite structures, such as non-uniform or complex surface geometries, complicate the compaction process. In order to satisfy tight tolerances and/or achieve complex surface geometries, specially made tools, sometimes referred to as pressure intensifiers, are used to direct pressure to those surface areas which are tolerance critical or possess special geometries. These pressure intensifiers also serve to distribute the applied compaction pressure over the surface of the layup in a desired manner, particularly where source of pressure is derived from vacuum bagging.

In the past, the pressure intensifiers described above were often fabricated from an elastomeric material formed into the shape of the tool using a mold. It was thus necessary to fabricate the mold, and then prepare it by cleaning the mold surfaces and applying a release coating. The elastomeric material had to be mixed and poured into a heated mold, and then cured and sometimes surface finished before it could be used. The entire molding process was therefore relatively time and labor intensive. The resources needed to fabricate and prepare the mold represented substantial manufacturing costs in the case of short production runs, such as those encountered in the aircraft industry, for example. In addition, the dimensional accuracy the molded type intensifier tools was sometimes less than desirable. This is because molded features of the tool depend on the accuracy of the mold cavity, the cleanliness of the mold, the potential introduction of voids into the molding material, part shrinkage and other factors.

Accordingly, there is a need in the art for an improved method of manufacturing a pressure intensifying tool which overcomes the deficiencies of the prior art discussed above. The present invention is directed toward satisfying this need.

SUMMARY OF THE INVENTION

In accordance with one aspect of the invention, a method is provided for manufacturing a tool used to intensify the pressure applied to areas of a plastic laminate part layup during co-curing or co-bonding. The method comprises the steps of generating a digital data file representing a three dimensional model of the tool, and using the digital data file to direct automated manufacturing of the tool in which additive layers of material are successively formed, one on top of the next, until the features the tool match those of the three dimensional model. The digital data file is preferably created using a CAD model of the tool, and then converting the CAD file to STL file format. The additive layering may be performed by any of several rapid prototyping techniques. The method may include integrally forming a variety of features in the tool, such as a pressure relief that allows the tool to flex, a dam to limit material flow, resin bleed channels and part trim lines.

According to another aspect of the invention, a tool used to intensify the pressure applied to features of a plastic laminate part layup during co-curing or co-bonding is manufactured by: generating a CAD drawing representing the tool, producing a digital data file corresponding to the CAD drawing, and using the digital data file to control the operation of a rapid prototype manufacturing machine, where the tool is formed by additive layering of material in the machine until the features and dimensions of the layered material correspond to those in the CAD drawing. The tool may be formed in one or more complimentary but separate parts.

In accordance with still another aspect of the invention, a tool for intensifying the compaction pressure applied to a layup of laminate plies during co-curing or co-bonding, comprises the steps of: generating a digital data file representing the features and dimensions of the tool, and additively layering materials under automatic control of the digital data file to form the tool. The additive layering of the materials may be performed by fused deposition modeling. The digital data file is preferably derived from one or more CAD drawings of the tool. The tool may comprise two or more separate but complimentary parts.

The manufacturing process of the present invention advantageously eliminates the need for fabricating a mold and using the mold to form the tool. Direct digital manufacturing of the pressure intensifier tool assures that dimensions and surface features of the tool very nearly approach the theoretical design values for the tool. The manufacturing process allows the tool to be directly digitally manufactured using a CAD drawing file and readily available rapid prototyping techniques, making the process particularly suitable for low production runs requiring high part accuracy.

Various additional objects, features and advantages of the present invention can be more fully appreciated with reference to the detailed description and accompanying drawings that follow.

DETAILED DESCRIPTION OF THE PREFERRED EMBODIMENTS

Figure 1:
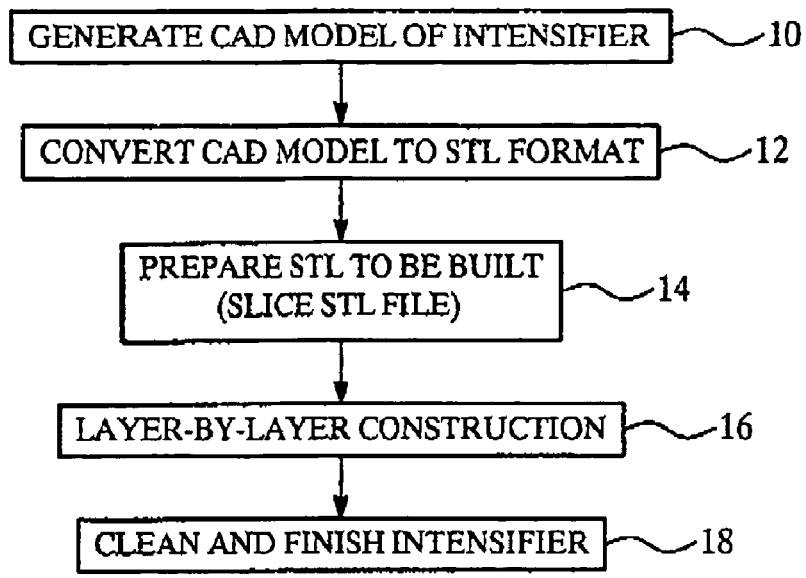
FIG. 1 is a flow diagram showing the steps of a method for manufacturing a pressure intensifying tool.

FIG. 1 broadly shows the steps of a method for manufacturing a pressure intensifier tool used for directing pressure applied to compact areas of plastic part lay up during co-curing or co-bonding of the plies and binder that form the layup. As shown at step 10, the first step involves generating a digital model of the tool, which is preferably performed by generating a CAD (Computer Aided Design) model of the tool using any of a variety of commercially available software. Other techniques can be employed, of course, to produce the digital file, providing that they result in accurately describing the theoretical dimensions and surface geometry of the desired tool. The CAD software is essentially a surface modeler that builds a number of mathematical patches or surfaces that, when joined together, form the shape and dimensions of the desired tool. In order to assure that the tool is properly and completely modeled, the CAD file is converted to STL (Stereolithography) file format, at step 12. The STL file comprises a plurality of triangles or facets which define every feature of the tool. Each facet is defined by the position of its three corners in space, and its direction, which distinguishes between internal and external surfaces. Each facet is connected to three others at its edges, so that the total volume of the model may be enclosed.

With the digital CAD file having been converted to STL format, the file is then processed at 14 so as to slice the model of the tool into a plurality of cross sections or thin layers. This is accomplished by dividing the CAD model with a series of closely spaced horizontal lines. The resulting file is an SLI or "slice" file which represents a series of closely spaced cross sections of the three dimensional tool model.

The sliced STL file, which is in digital format, is then used to digitally control a machine which produces a physical embodiment of the tool in an additive, layer-by-layer process shown at step 16. This machine comprises what is commonly referred to in the art as a rapid prototyping machine that automatically constructs physical models from CAD data files. The prototyping technology is also sometimes referred to as solid free-form fabrication, computer automated manufacturing or layered manufacturing. Rapid prototyping is an additive process, which combines layers of paper, wax or plastic to create a solid object. The additive nature of this process allows the machine to create objects with complicated internal features that cannot otherwise be manufactured by other means, such as molding.

Any of several well known rapid prototyping technologies and equipment may be employed, including stereolithography, laminated object manufacturing, selective laser sintering, fused deposition modeling, solid ground curing and 3-D ink jet printing. However, fused deposition modeling has been found to be particularly effective in producing the pressure intensifier tool.

In fused deposition modeling, filaments of heated thermoplastic are extruded from a tip that moves in an X-Y plane. A controlled extrusion head deposits very thin beads of material onto a platform to form the first layer. The platform is maintained at a lower temperature so that the thermoplastic quickly hardens. After the platform lowers, the extrusion head deposits a second layer upon the first layer. Supports may be built during the layering process, which are fastened to the part, either with a second, weaker material or with a perforated junction. The extruded plastic may comprise ABS, elastomer, polycarbonate, polyphenolsulfone, or investment casting wax. After the tool has been fully formed by the layer-by-layer construction at step 16, the tool is cleaned and finished (as required) at step 18. The finishing process may consist of surface finishing, such as simple sanding of tool surfaces or edges. The resulting tool possesses a surface geometry and dimensions that essentially conform to the exact theoretical shape of the tool represented by the original CAD drawing.

Figure 2:
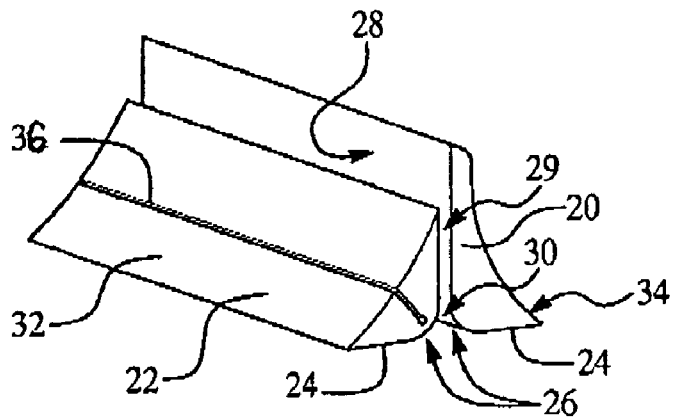
FIG. 2 is a perspective view of a two piece tool manufactured in accordance with the method of the present invention.
Figure 3:
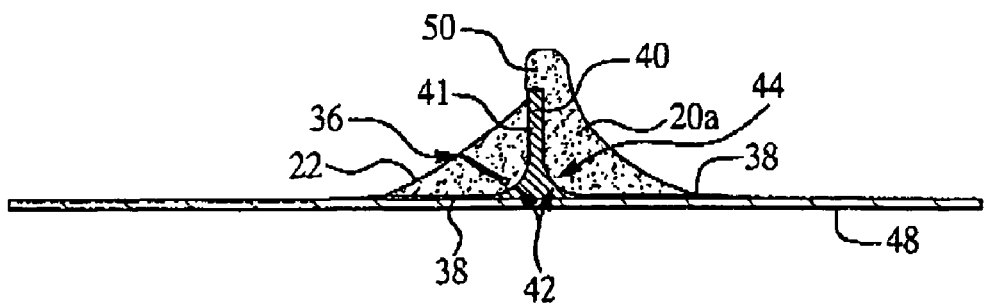
FIG. 3 is a cross sectional view taken through an alternate form of a two piece pressure intensifier tool, shown in installed relationship to a part layup.
Figure 4:
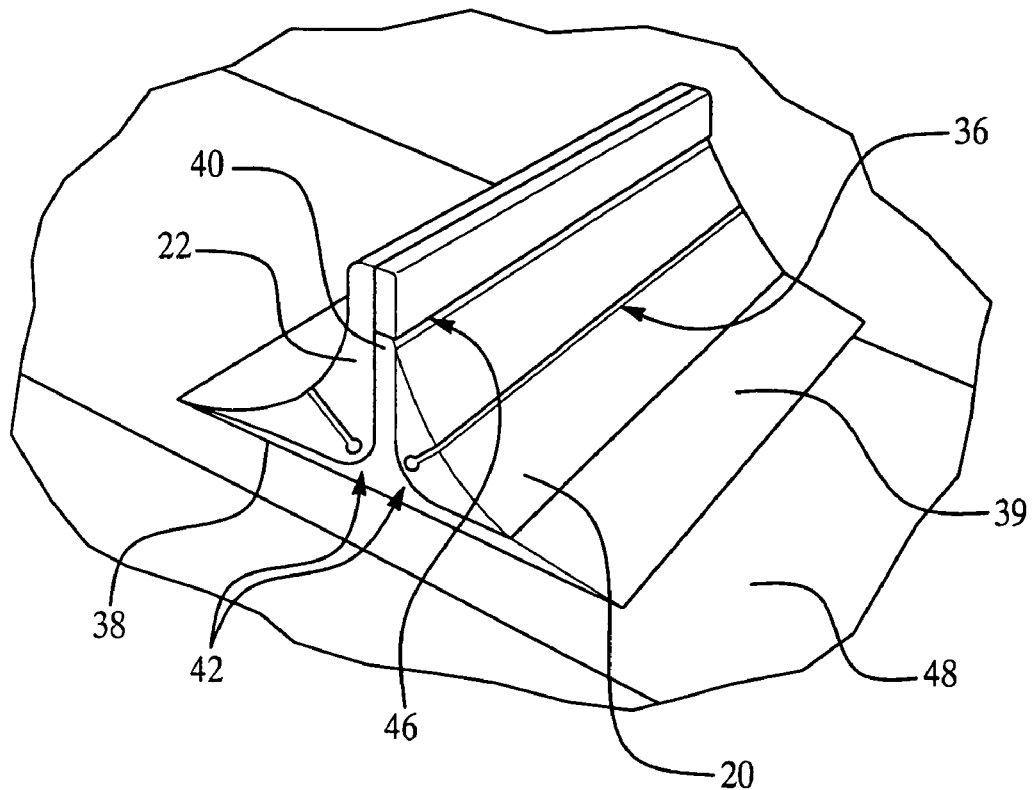
FIG. 4 is perspective view of the two piece tool shown in FIG. 2, but positioned on a part layup before installation of a vacuum bag.

Attention is now directed to FIGS. 2–4 which illustrate a two piece tool comprising first and second tool members 20, 22 respectively. Tool member 20 includes an essentially flat bottom 24, an orthogonal, vertical sidewall 28 and an inwardly curved, outside side wall 34. The bottom and side walls 24, 28 are connected by a radius section 26. Tool member 22 also has a flat side 29 and a perpendicularly extending side wall 28 connected to a flat bottom 24 by a second, inwardly curved outside wall 32. Bottom 24 and side wall 28 are also connected by a radius section 26. Tool members 20, 22 are positioned relative to each other such that side walls 28, 29 are slightly spaced apart and parallel to each other, so that the tool members 20, 22 conformably engage a part lay up 40 during co-curing or co-bonding.

The illustrated part layup 40 is a stiffener, comprising a rigid structural member 44 which is generally T-shaped in cross section and is intended to structurally stiffen and provide support for an outer skin 48. Structural member 44 includes an upstanding central leg or stiffener rib 41 having opposite faces that are respectively engaged by tool side walls 28, 29. The structural member 44 further includes a pair of horizontally extending legs 38 which are to be bonded to the skin 48 and are engaged by the flat bases 24 of tool members 20, 22. The upstanding stiffening rib 41 is joined to the base legs 38 by a pair of radii 42 which are conformably engaged by the radius sections 26 on the tool members 20, 22.

As best seen in FIG. 4 the part lay up 40 includes one or more plies 39 of a fiber reinforced mat pre-impregnated with a suitable plastic resin, which covers a portion of the skin 48 as well as the sides and base of the rigid structural member 44. Not shown in the drawings is a vacuum bag case, typically of flexible plastic which, during fabrication, is positioned around the combination of the part layup 40 and tool members 20, 22, and is evacuated of air so that the bag conformably engages the exposed sides and edges of the part layup 40 as well as the tool members 20, 22. Specifically, the vacuum bag case engages the curved side walls 32, 34, thereby forcing the tool members 20, 22 against the part layup 40. The curvature of the side walls 32, 34 results in a component of the compaction force being applied by the bag case being redirected downwardly against the base legs 38. The tool members 20, 22 effectively direct the compaction force applied to the surface areas of the part layup 40 that are engaged by the mating surfaces of the tool members 20, 22, thereby assuring that the plies 39 are adequately compacted during throughout time required for the binder to harden and bond the plies together, otherwise referred to herein as co-curing or co-bonding.

Various structural features, including at least one Relief, may be incorporated into the tool members 20, 22. As illustrated in FIG. 3, a relief may include, but is not limited to: a longitudinally extending slot 36 in the side walls 32. The slot 36 extends down into the tool member 22 to a position near the radius 26 so that the remaining material between the bottom of the slot 36 and the radius 26 forms a flexible hinge that allows the sides and base of the tool member 22 to flex slightly under the force of the bag case, thereby assuring better conformal engagement with the mating surfaces of the part layup 40, and accommodating inconsistencies in the part due to variations in material thickness and local ply tolerances.

As shown in FIG. 3, an optional dam 50 is provided near the top of tool member 20a which includes a shoulder overlying the top of the structural rib 41. The dam 50 holds the part lay up 40 in proper alignment and prevents the top of the part layup 40 from being displaced upwardly as a result of the applied pressure. A variety of other structural features may be incorporated into the tool members 20, 22, such as resin bleed channels and part trim lines.

It should be pointed out here that the tool members 20, 22 may be solid, as shown in the drawings, or may have one or more hollow sections or cavities. Also, the method of, fabricating the pressure intensifying tool is not limited to producing tools with true radii, but can produce elliptical, parabolic or other complex geometries, including two or three dimensional geometries, such as a corner. The tools 22, 24 may possess feathered edges in order to reduce the tendency of the tools to produce notable mark-off on the finished part during curing.

The exact selection of the material used to form the tools 22, 24 will depend on the application. Acrylonitrile Butadiene Styrene (ABS) is suitable for use up to approximately 200 degrees F., while a polycarbonate (PC) should be satisfactory for processes using temperatures up to about 250 degrees F. Polyphenyl Sulfone (PPSF) is a material suitable for use with temperatures up to at least 350 degrees F.

Figure 5:
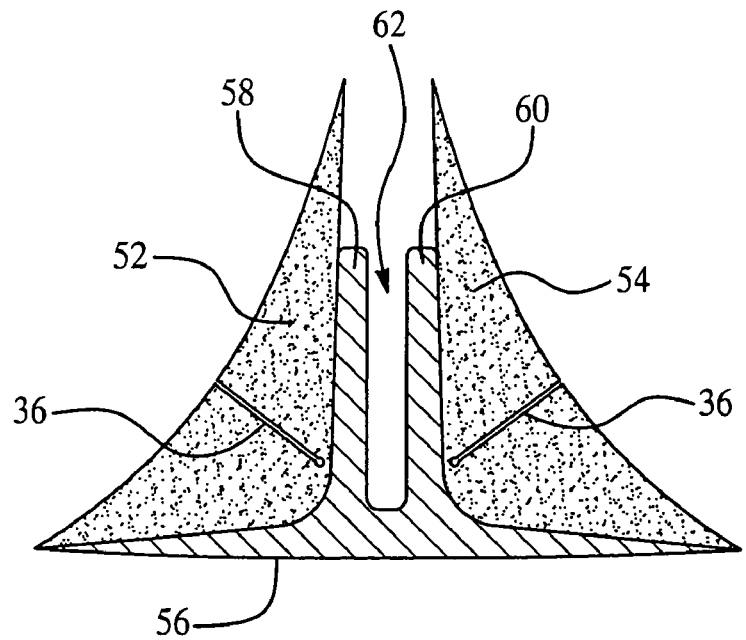
FIG. 5 is cross sectional view showing an identical pair of pressure intensifying tools in relationship to a different part layup configuration, prior to the installation of a vacuum bag.

FIG. 5 depicts a pair of identical pressure intensifier tools 52, 54 which are similar in construction to the tool member 22 previously described. In this application, however, tool members 52, 54 are employed to intensify the pressure applied to a part layup 56 having a pair of spaced apart side walls 58, 60 separated by a gap 62.

Although this invention has been described with respect to certain exemplary embodiments, it is to be understood that the specific embodiments are for purposes of illustration and not limitation, as other variations will occur to those of skill in the art.

What is claimed is:

1. A method of manufacturing a tool used to direct pressure applied to areas of a plastic laminate part during co-curing or co-bonding, comprising the steps of:
   (A) generating a digital data file representing a three dimensional model of the tool; and,
   (B) using the digital data file to direct automated manufacturing of the tool in which additive layers of material are successively formed until the features of the tool correspond to the three dimensional model, wherein the three dimensional model includes separate complementary pieces each having a surface for engaging and intensifying the pressure applied to the part, and wherein the three dimensional model includes at least one relief, the at least one relief comprising an elongated slot provided in the tool.

2. The method of claim 1, wherein step (A) includes creating a CAD model of the tool.

3. The method of claim 2, wherein step (A) includes converting the CAD model to an STL file format.

4. The method of claim 3, wherein step (A) includes using the STL formatted file to generate a slice file representing a plurality of spaced cross sections of the three dimensional model.

5. The method of claim 1, wherein step (B) is performed using a rapid prototype machine automatically controlled by the digital data file.

6. The method of claim 1, wherein the additive layers are formed using one of the following manufacturing techniques:
   a) laminated object manufacturing,
   b) selective laser sintering,
   c) fused deposition modeling,
   d) solid ground curing,
   e) three dimensional ink-jet printing.

7. The method of claim 1, including the step of finishing surfaces of the tool to obtain desired surface characteristics.

8. The method of claim 1, wherein step (A) includes integrally forming features in the three dimensional model used in co-curing or co-bonding the part.

9. A tool used to direct the pressure applied to features of a plastic laminate part during co-curing or co-bonding of the part, manufactured by:
   (A) generating a CAD drawing representing the tool and wherein the tool comprises a relief for allowing the tool to flex during the co-curing or co-bonding, wherein the relief comprises an elongated slot provided in the tool;
   (B) producing a digital data file corresponding to the CAD drawing; and,
   (C) using the digital data file to control the operation of a rapid prototype manufacturing machine, wherein the tool is formed by additive layering of material in the machine until the features and dimensions of the layered material correspond to the CAD drawing.

10. The tool of claim 9, wherein step (B) includes converting the digital data file to an STL file format, and using the STL formatted file to generate a slice file representing a plurality of spaced cross sections of the CAD drawing.

11. The tool of claim 9, including the step of finishing surfaces of the tool to obtain desired surface smoothness.

12. The tool of claim 9, wherein step (A) includes forming a dam for limiting the movement of constituents of the laminate during the co-curing or co-bonding.

* * * * *